United States Patent [19]
Williams

[11] Patent Number: 5,941,530
[45] Date of Patent: Aug. 24, 1999

[54] UNIDIRECTIONAL ENVIRONMENT BARRIER SEAL FOR SUBSEA WELLHEAD EQUIPMENT AND VALVES

[75] Inventor: Michael R. Williams, Houston, Tex.

[73] Assignee: FMC Corporation, Chicago, Ill.

[21] Appl. No.: 08/386,388

[22] Filed: Feb. 10, 1995

[51] Int. Cl.$^6$ .............................. E21B 33/03; F16L 17/06; F16J 15/02
[52] U.S. Cl. .......................... 277/322; 277/608; 277/614; 277/626; 277/914; 277/928
[58] Field of Search ...................... 277/3, 29, 58

[56] References Cited

U.S. PATENT DOCUMENTS

| | | | |
|---|---|---|---|
| Re. 34,071 | 9/1992 | Van Bilderbeek | 166/342 |
| 2,748,869 | 6/1956 | Hager | 166/75 |
| 3,220,245 | 11/1965 | Van Winkle | 73/46 |
| 3,406,373 | 10/1968 | Forney, Jr. . | |
| 3,523,579 | 8/1970 | Nelson | 166/6 |
| 3,892,416 | 7/1975 | Ruhe et al. . | |
| 4,234,216 | 11/1980 | Swanson | 285/93 |
| 4,346,801 | 8/1982 | Redder et al. . | |
| 4,350,346 | 9/1982 | Fowler . | |
| 4,381,868 | 5/1983 | Croy et al. . | |
| 4,392,832 | 7/1983 | Moberg . | |
| 4,470,609 | 9/1984 | Poe . | |
| 4,569,540 | 2/1986 | Beson | 285/93 |
| 4,817,994 | 4/1989 | Bronnert | 285/93 |
| 4,919,456 | 4/1990 | Wong | 285/39 |
| 5,090,871 | 2/1992 | Story et al. | 417/9 |
| 5,100,157 | 3/1992 | Chabala . | |

Primary Examiner—Anthony Knight
Assistant Examiner—John L. Beres
Attorney, Agent, or Firm—Henry C. Query, Jr.

[57] ABSTRACT

A sealing arrangement for a subsea wellhead component is provided which comprises a primary seal to prevent leakage of internal pressure from within the wellhead component and a secondary seal surrounding the primary seal to prevent entry of ambient pressure into the wellhead component. The secondary seal is adapted to permit pressure which leaks past the primary seal to also leak past the secondary seal and vent to the atmosphere to provide an indication during testing of the primary seal that the primary seal has failed.

2 Claims, 7 Drawing Sheets

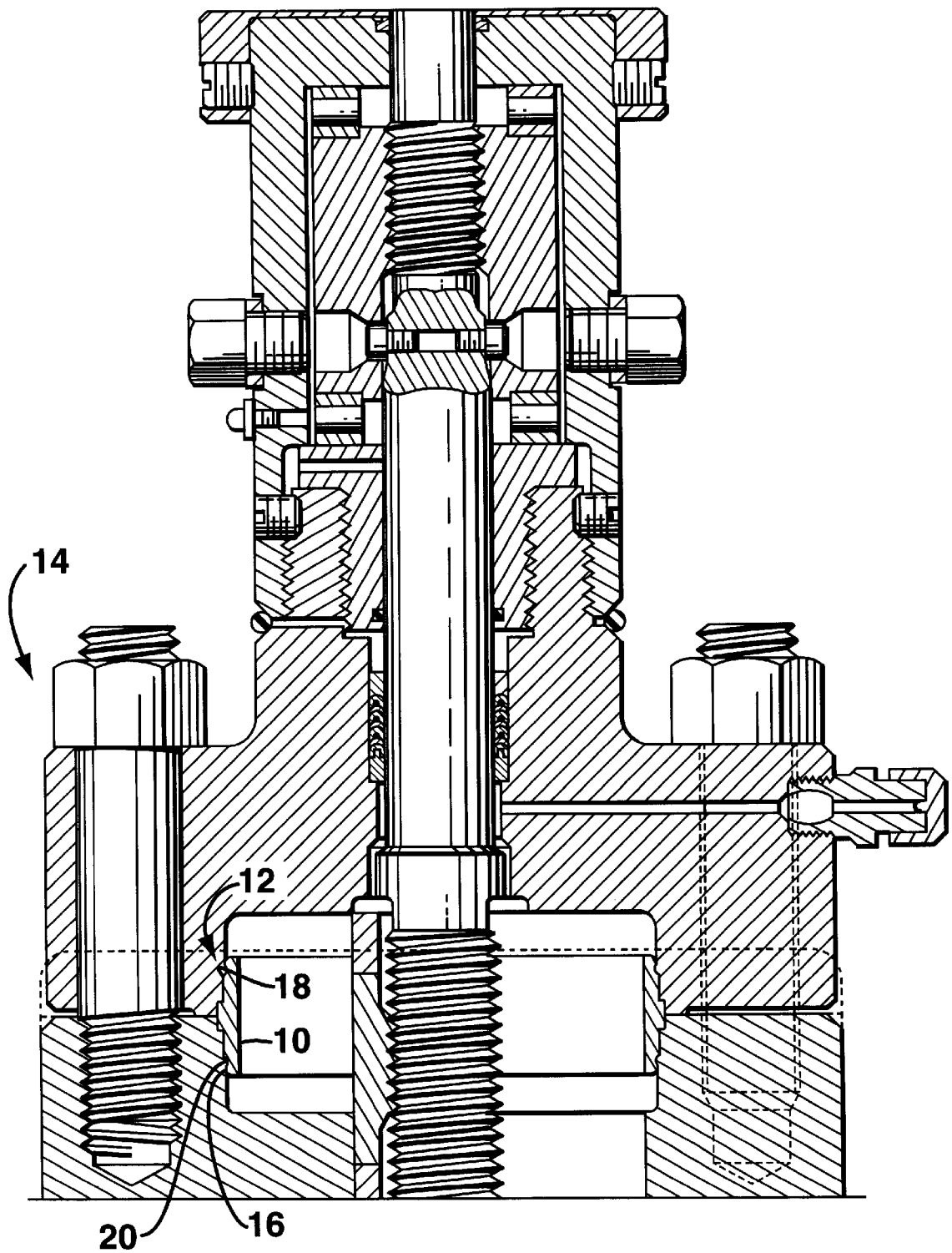
FIG_1
PRIOR ART

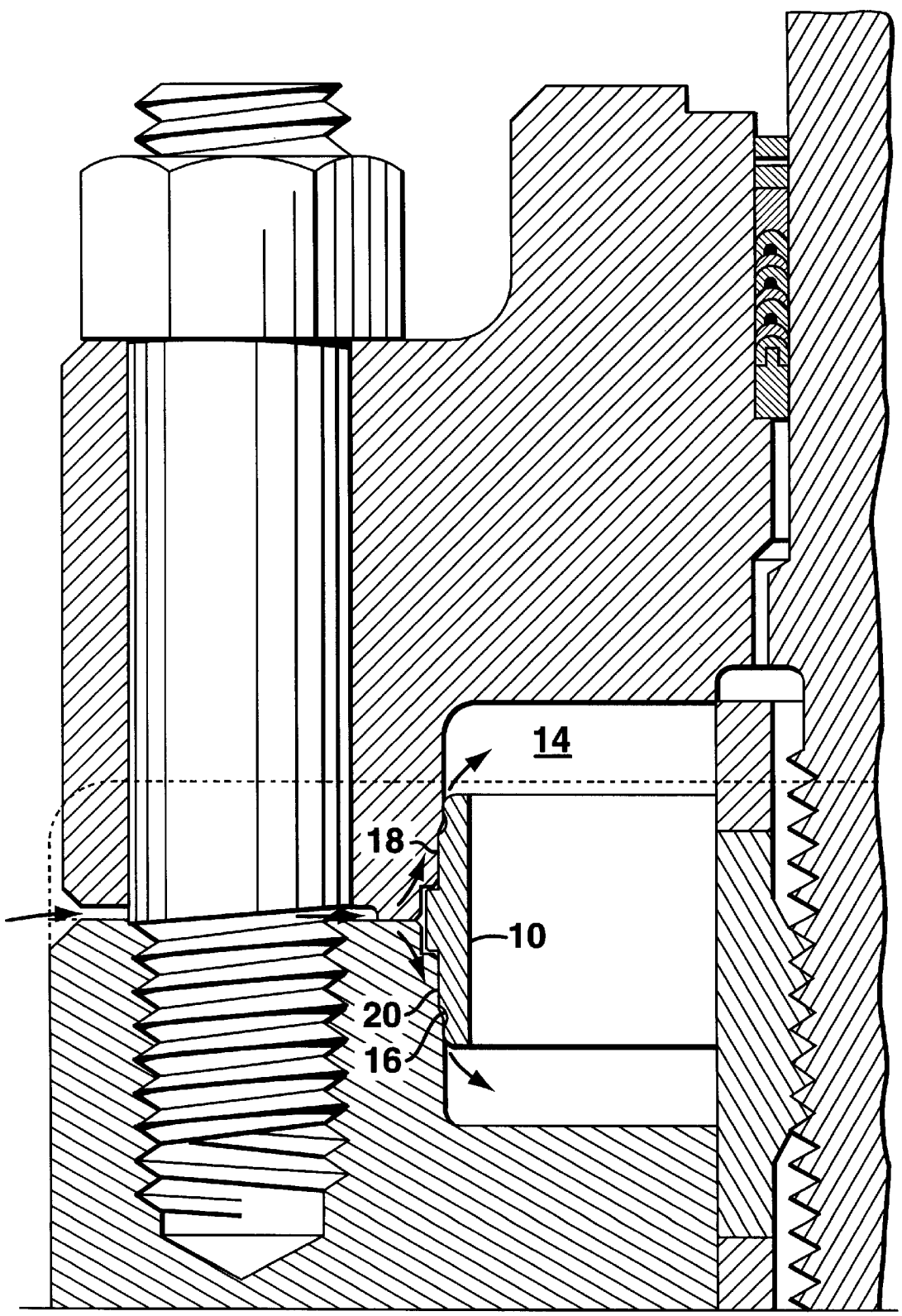
FIG_2
PRIOR ART

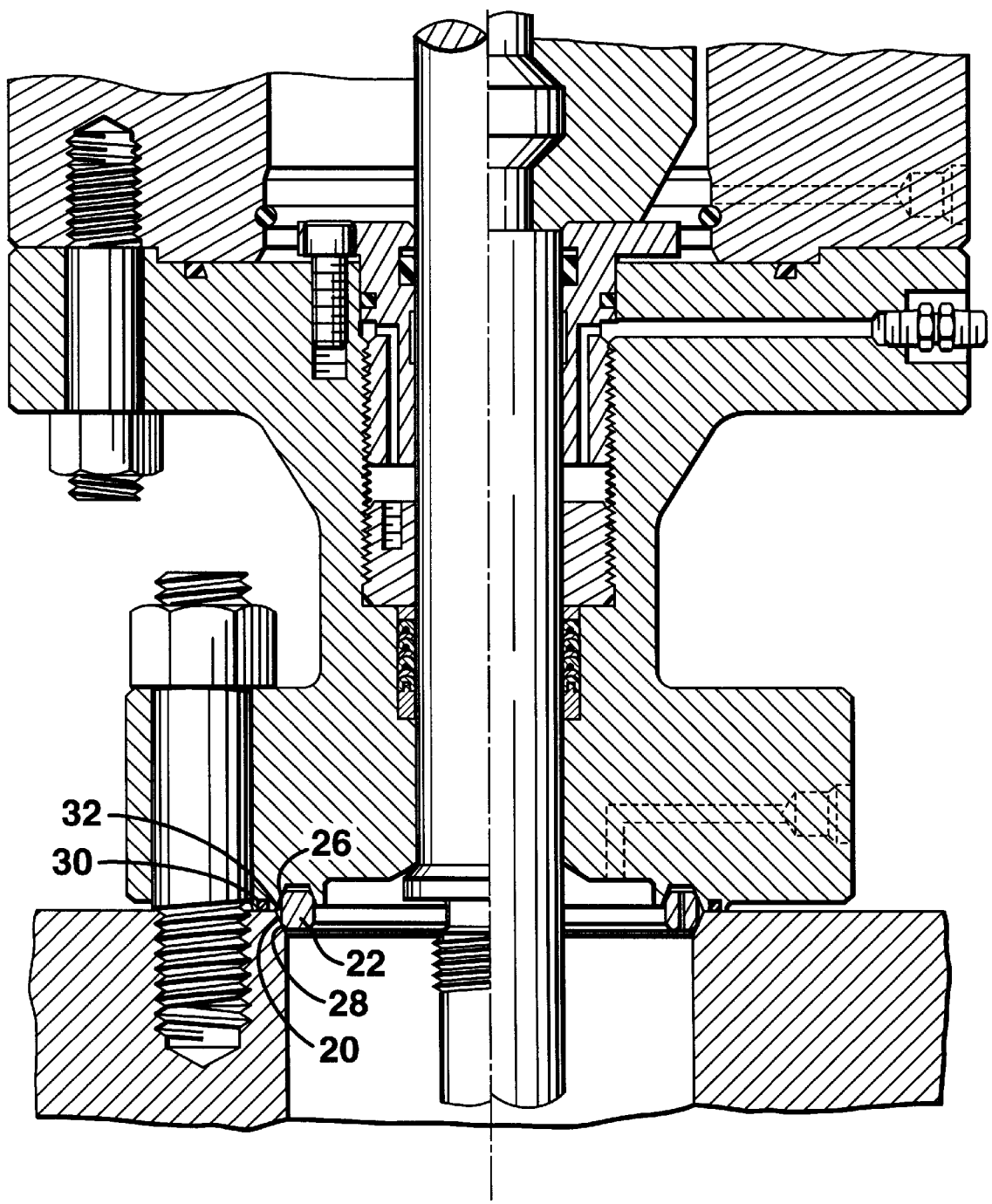
FIG_3
PRIOR ART

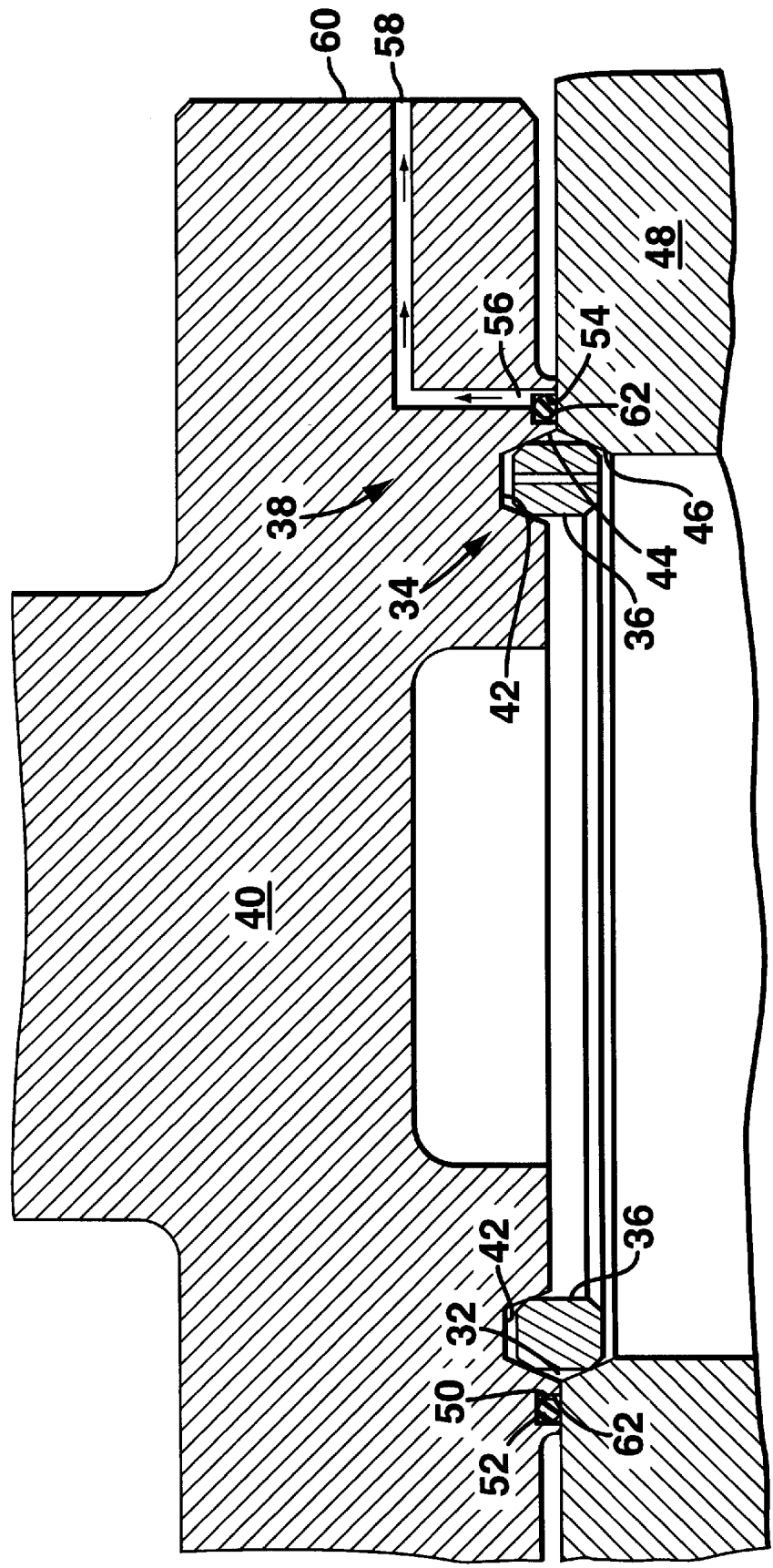
FIG_4

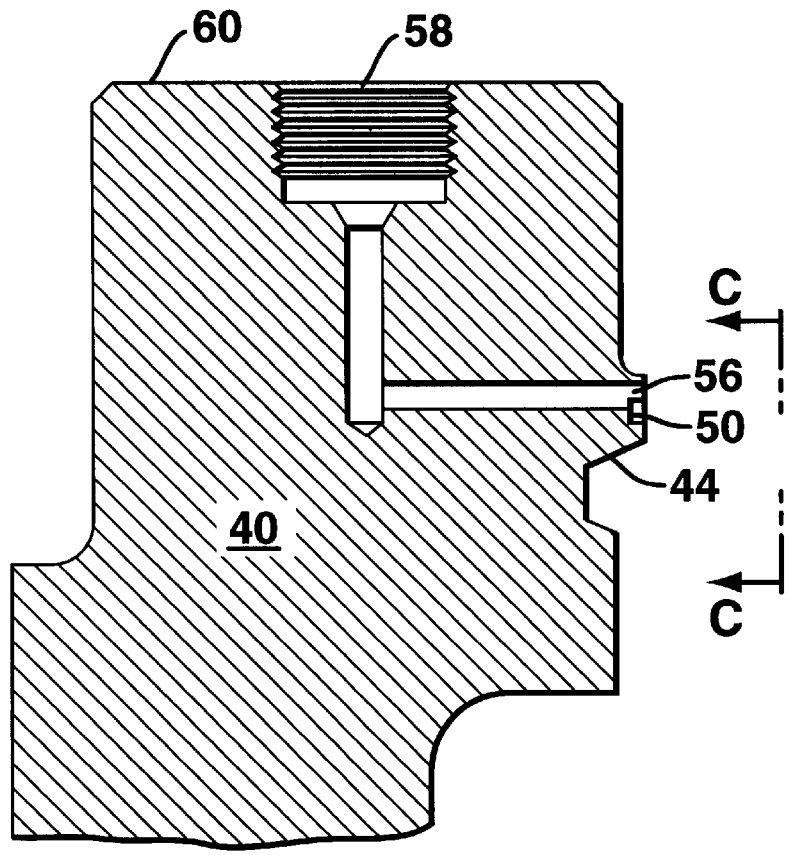
FIG_5
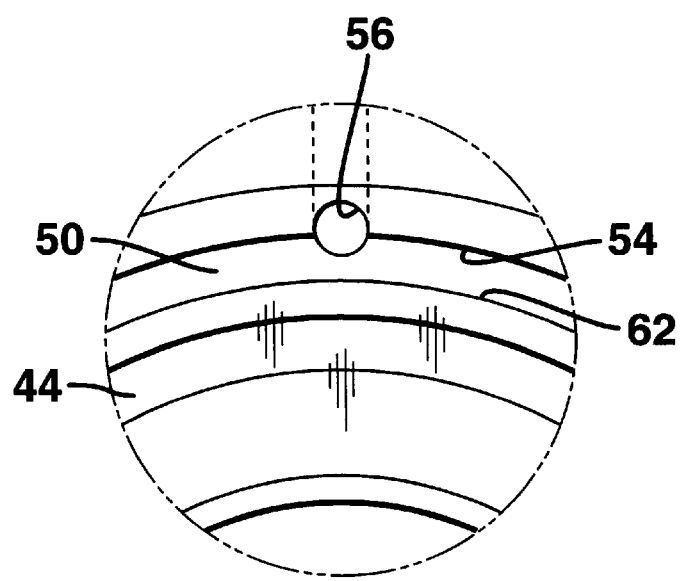
FIG_6

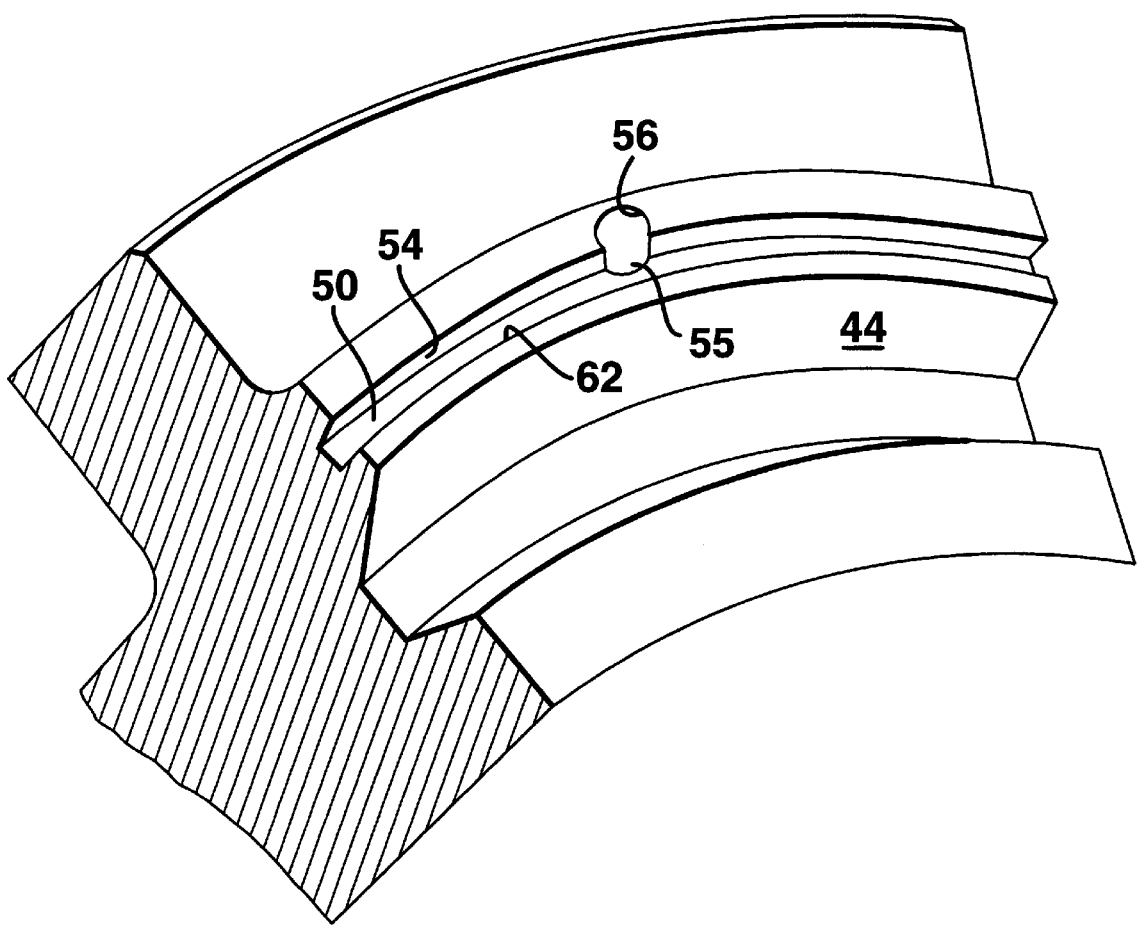
FIG_7

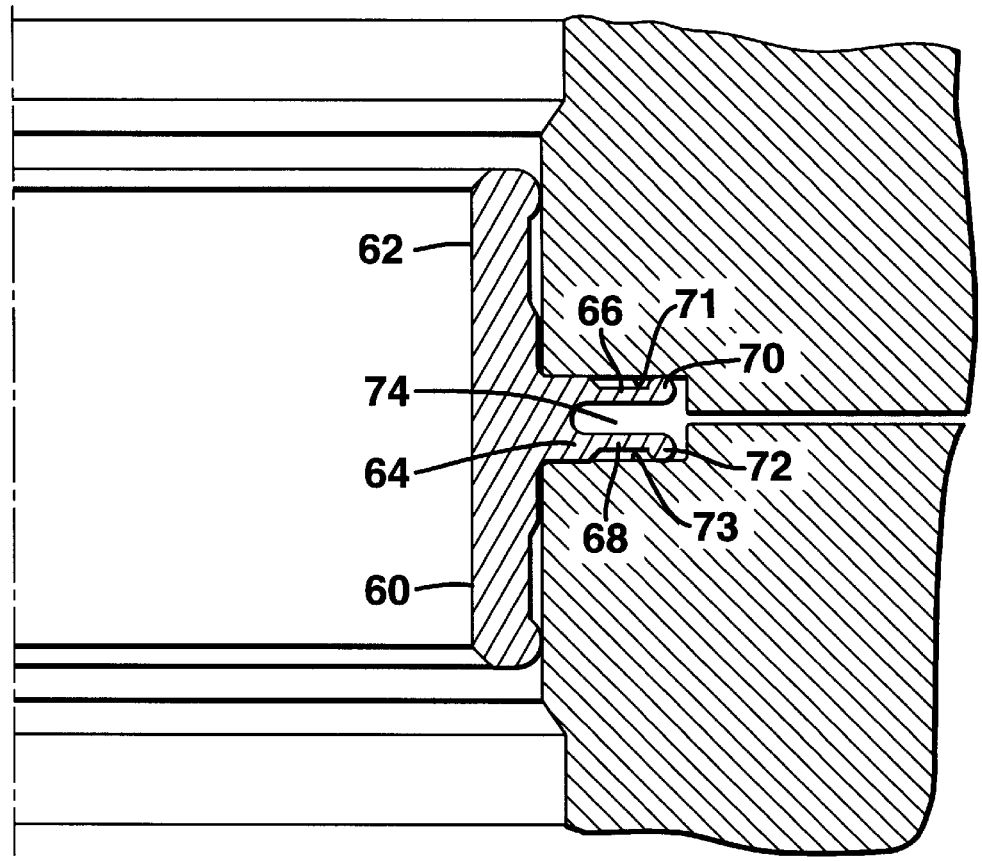
FIG_8
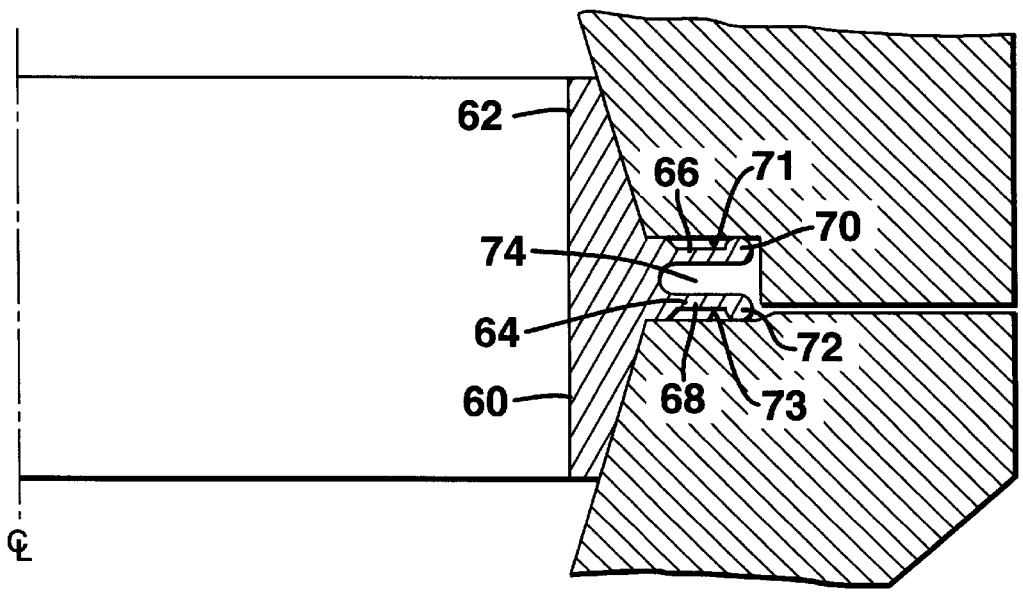
FIG_9

5,941,530

UNIDIRECTIONAL ENVIRONMENT BARRIER SEAL FOR SUBSEA WELLHEAD EQUIPMENT AND VALVES

BACKGROUND OF THE INVENTION

The present invention relates to internal and external sealing of fluid handling components and, more particularly, to sealing means that allow venting of internal pressure while sealing out external pressure when ambient pressure may exceed internal pressure.

In the offshore petroleum industry, petroleum reservoirs are often in deep waters where surface production platforms are not feasible. In such deep waters wellhead and christmas tree equipment are typically installed at or near the sea bed. Production from such deep wells requires the use of submarine pipelines or production risers to transport the petroleum to the surface. The ambient hydrostatic pressure is very high at great depths, often as much as several thousand pounds per square inch. Therefore, in such deep water applications, subsea equipment must be designed to seal out high pressure ambient seawater while containing petroleum products internally.

With regard to the above-mentioned problems that occur during well production, known sealing devices for use with wellhead and christmas tree connections include conventional metallic ring gaskets (10), as shown in FIG. 1. Such conventional ring gaskets are effective in sealing internal fluids at extremely high pressures. They may not, however, be effective at sealing out external water pressure when the ambient pressure exceeds the internal pressure. This is because typical ring gaskets of this type for use in subsea equipment are pressure energized seals in which sealing tightness is dependent upon internal pressure. Such seals are designed to more tightly seal as internal pressure increases relative to external pressure. As described above, situations may exist where the ambient pressure may exceed the internal pressure such that the resultant pressurization is reversed. In the aforementioned decreased or reversed pressure situations, it is likely that the pressure energized seals will become de-energized or will be insufficiently energized such that leaking, and thus damage to the well assembly, may occur.

FIGS. 1 and 2 illustrate a prior art sealing assembly (12) for a typical bolted flange connection (14) on a subsea gate valve. The sealing assembly (12) includes a metallic ring gasket (10). The gasket (10) is a pressure energized seal such that as internal pressure increases, the force that presses the gasket against the sealing surfaces (16, 18) also increases. If the gasket (10) is subjected to external pressure, the force of the external pressure acting on the outer diameter surface (20) of the gasket (10) pushes the gasket (10) away from the sealing surfaces (16,18) allowing external fluids to leak past the seal and into interior of the connection (14).

Another prior art metallic ring gasket known as an "API BX" type ring gasket (22) is shown in FIG. 3. The BX gasket (22), widely used with wellhead and christmas tree connections, is pressure energized to some extent. When subjected to high external pressures that are typical in deep water subsea wells, the BX type gasket (22) is prone to leakage due to the force of the external pressure acting on the outer diameter surface (20) of the BX gasket (22) and pushing the gasket (22) away from the sealing contact surfaces (26,28). In this instance, the pressurized fluid will leak past the seal and into the interior of the connection.

One known solution to prevent leakage into such connections as shown in FIG. 3 is to provide a secondary barrier seat (30) to prevent external pressure from reaching a first seal (22). A conventional o-ring seal is suitable for such sealing. Typically, an elastomeric material is used rather than a metal seal because it is inexpensive and it is adequate for sealing seawater.

It is common practice to conduct high pressure internal tests on these types of connections at pressures 1.5–2 times the normal internal pressure rating. Most simple elastomeric rings seal equally well in both directions. Thus, if the primary metallic ring gasket (22) were to leak during the internal pressure testing, the test fluid would enter the region (32) between the ring gasket (22) and the secondary barrier seal (30). One of both of the following two results could occur.

First, the pressurized test fluid could exert upon the connection components a separating force and result in damage to the connection.

Second, if the pressurized test fluid were to leak past the primary gasket (22) and then be contained by the secondary seal (30), such leakage may go undetected. Without any external indication that the primary seal (22) was not functioning properly, the faulty connection may be inadvertently placed into service. Once in service, the faulty connection could allow corrosive petroleum fluid to leak past the primary seal (22) and eventually corrode the secondary seal (30) causing it to fail. Retrieval and replacement of such equipment in deep water is usually difficult, expensive, and time consuming. It is therefore essential to detect and remedy seal leakage prior to shipment or installation of the equipment.

SUMMARY OF THE INVENTION

The present invention provides a simple and inexpensive sealing system for a well connection of the type described above including a secondary external barrier seal to prevent ambient seawater from entering the connection interior when the ambient seawater pressure is higher than the internal petroleum pressure and to allow any leakage of internal fluids past the primary seal to be vented externally of the secondary seal to be easily detected during factory testing. This is accomplished by designing the secondary barrier seal to be "uni-directional" in that it will seal out external pressure but will permit venting or escape of internal pressure. The secondary barrier seal is designed to be compatible with existing structural geometry of conventional subsea wellhead and christmas tree connections to minimize redesign or alteration of existing equipment to accommodate the new barrier seal system.

BRIEF DESCRIPTION OF THE DRAWINGS

FIG. 1 is cross sectional view of a wellhead component showing a conventional metallic ring gasket;

FIG. 2 is an enlarged portion of FIG. 1;

FIG. 3 is a cross-sectional view of a wellhead component showing an alternative conventional metallic ring gasket;

FIG. 4 is a cross sectional view of a wellhead component comprising the seal arrangement of the present invention;

FIG. 5 is a portion of the view of FIG. 4;

FIG. 6 is a detail of a portion of the assembly of FIG. 5 taken through C—C of FIG. 5;

FIG. 7 is an orthogroptic projection of the assembly element of FIG. 6 clearly showing the unidirectional vent port;

FIG. 8 is an alternative embodiment of the invention having a secondary barrier seal;

FIG. 9 is an alternative embodiment of the invention having a secondary barrier seal in an alternative location.

DESCRIPTION OF THE PREFERRED EMBODIMENT

Shown in FIG. 4 is a sealing arrangement (34) of the present invention including a primary metallic ring gasket seal (36) and a secondary barrier seal system (38). The first connection member (40) has a primary circumferential groove (42) adapted to receive the ring gasket seal (36). A first contact surface (44) of the first connection member (40) lays in a radial plane and is adapted to engage a corresponding second contact surface (46) of a second connection member (48). Each of the contact surfaces (44, 46) are ring-shaped and together surround the primary ring gasket seal (36). The first contact surface (44) of the first connection member (40) has a secondary circumferential groove (50) surrounding and radially spaced from the primary circumferential groove (42). The secondary circumferential groove (50) has a cross-section of generally rectangular or other suitable configuration adapted to receive and maintain a conventional elastomer ring seal (52). The ring seal (52) may be an o-ring (as shown) or other conventional elastomer seal.

Referring to FIGS. 4 through 7, the outer circumferential portion (54) of the secondary circumferential groove (50) is provided with at least one vent port (56) that forms a fluid passage connecting the secondary circumferential groove (50) with the external environment at an exit (58) on the outer surface (60) of the first connection member (40). When the secondary barrier seal (52) is pressurized from its outside diameter surface by fluid pressure that may enter between the sealing contact surfaces (44, 46), the secondary seal (52) is fully supported in sealing contact by the inner circumferential portion (62) of the secondary circumferential groove (50), and no fluid pressure will leak past the secondary seal (52) toward the interior of the connection.

If, however, the internal fluid pressure should leak past the primary gasket seal (36) and cause the pressure to act on the inside diameter surface of the secondary seal (52), the secondary (52) will be pushed radially outward in the void (55) formed by intersection of the port (56) and the secondary circumferential groove (50). This will allow the internal pressure to leak past the secondary seal (52) and into the port (56). The pressure will then exit the port (56) at the surface exit (58), thus preventing pressure build-up in the annular area between the primary ring gasket (36) and the secondary barrier seal (52). Therefore, if the primary ring gasket (36) is not sealing properly during factory testing the leak may be detected and replaced prior to shipment and installation of the equipment.

The number of vent ports and the actual shape and location of each vent port may vary to suit a specific application without departing from the basic principle of the present invention. The basic principle of the invention is the use of an unsupported area in the outer circumferential wall of the secondary groove adjacent to the outside diameter of the secondary barrier seal such that any build-up of internal pressure will deflect the barrier seal radially outward to allow bypass thereof and subsequent venting through the port.

It is recognized that, if desired, the direction of operation of the unidirectional seal can be reversed such that the unsupported area is placed adjacent to the inside diameter of the barrier seal.

FIGS. 8 and 9 illustrate alternative embodiments of the present invention which both utilize a unitary ring sealing element (60) having an inner circumferential portion (62) forming an internal pressure energized primary seal (62) and outer circumferential portion (64) forming a secondary barrier seal for sealing out external pressure. The primary seal portion (62) of either FIG. 8 or FIG. 9 acts similarly to the ring gasket seal (36) described above. The secondary barrier seal (64) comprises, in cross-section, a u-shaped profile having a pair of resilient legs (66, 68) that extend radially outward. The legs (66, 68) are resilient such that when the legs are spring-fit in place, the bumps (70, 72) are biased against adjacent surfaces (71, 73) to form seals therewith.

As shown in FIGS. 8 and 9, when the seal is positioned the external pressure acting on the outer diameter side of the sealing member (60) will enter the area (74) between the legs (66, 68) causing the legs (66, 68) to spread apart such that the bumps (70, 72) more forcefully contact and seal with the sealing surfaces (71, 73) of the connection members.

If, however, the internal pressure were to leak past the primary seal (62) it would enter between each leg and the adjacent connection member and travel toward the outer bumps (70, 72). The pressure would then cause the legs to flex toward each other thereby enabling the internal pressure to leak past the bumps (70, 72) and vent externally.

While the preferred embodiments have been shown and described above, it is understood that modification and variation can be made without departing from what is regarded as the scope and spirit of the present invention.

What is claimed is:

1. A subsea wellhead system sealing arrangement for uni-directional sealing between internal and external pressures acting, respectively, on the inside and outside of a connection between a first connection member and a second connection member, said first connection member and said second connection member each having a generally circular contact surface, said contact surface having an inside diameter and an outside diameter, wherein said first and said second contact surfaces correspond and are engaged with each other, said sealing arrangement comprising:

a generally ring-shaped primary seal adapted to be positioned within the inner diameter of said contact surfaces thereby forming a seal to prevent leakage of internal pressure encompassed by the primary seal into the area outside of the primary seal between the first and second connection members;

a generally ring-shaped secondary barrier seal positioned concentrically around said primary seal and between said first and second connection member contact surfaces to prevent entry of external pressure to the area encompassed by the secondary barrier seal between the first and second connection members, said secondary seal member being adapted to temporarily deflect when subject to internal pressure encompassed therein that may have leaked past said primary seal in order to permit said internal pressure to pass to an area outside said secondary barrier seal.

2. A sealing arrangement according to claim 1, further comprising:

venting means in communication with said secondary barrier seal to an outer surface of said first or said second connection member for enabling passage of said internal pressure to a position external of said connection members.

* * * * *